United States Patent [19]
Uhlenhaut et al.

[11] 3,747,431
[45] July 24, 1973

[54] SAFETY SHIFTING LEVER FOR THE TRANSMISSION OF MOTOR VEHICLES

[75] Inventors: Rudolf E. Uhlenhaut, Stuttgart-Riedenberg; Friedrich H. van Winsen, Kirchheim/Teck; Hans Limmer, Korb Wurttemburg, all of Germany

[73] Assignee: Daimler-Benz Aktiengesellschaft, Stuttgart-Unterturkheim, Germany

[22] Filed: Feb. 18, 1971

[21] Appl. No.: 116,451

[30] Foreign Application Priority Data
Feb. 21, 1970 Germany.................. P 20 08 223.9

[52] U.S. Cl. ............................................... 74/524
[51] Int. Cl. ............................................. G05g 1/04
[58] Field of Search .................. 74/524, 523, 473 P, 74/473 R, 470, 544, 525

[56] References Cited
UNITED STATES PATENTS

| | | | |
|---|---|---|---|
| 2,334,057 | 11/1943 | Ashton et al. ........................ | 74/525 |
| 3,386,308 | 6/1968 | Butler .............................. | 74/525 X |
| 3,561,281 | 2/1971 | Wilfert............................. | 74/523 X |
| 1,908,423 | 5/1933 | Hjermstad........................... | 74/524 |
| 1,743,241 | 1/1930 | Schmidt............................. | 74/524 X |

FOREIGN PATENTS OR APPLICATIONS

| | | | |
|---|---|---|---|
| 292,301 | 6/1928 | Great Britain ....................... | 74/544 |
| 1,291,442 | 3/1962 | France .............................. | 74/544 |

*Primary Examiner*—Charles J. Myhre
*Assistant Examiner*—F. D. Shoemaker
*Attorney*—Craig & Antonelli

[57] ABSTRACT

A safety shifting lever for the transmission of motor vehicles having two mutually displaceable telescopically guided lever parts. The two parts are normally maintained in a first position with respect to one another corresponding to normal shifting operations. Provisions are made for permitting relative axial displacement of the lever parts under the influence of axial pressure forces that are larger than the forces necessary for shifting the transmission. A first embodiment includes a compression spring interposed in hollow spaces within the lever parts for normally biasing the lever parts into the first position corresponding to normal use. A groove and annular spring detent arrangement is provided for retaining the two parts in a second collapsed position against the force of the compression spring. A second embodiment includes friction bushings arranged around one of the parts for frictionally engaging an inner surface of the other part. A third embodiment utilizes a friction cone connection between the two lever parts.

13 Claims, 3 Drawing Figures

United States Patent [19]
Uhlenhaut et al.
[11] 3,747,431
[45] July 24, 1973
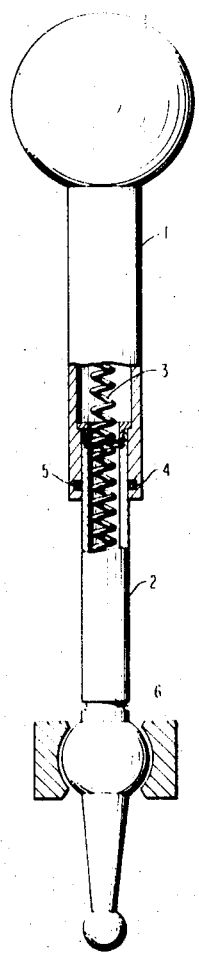

PATENTED JUL 24 1973
3,747,431
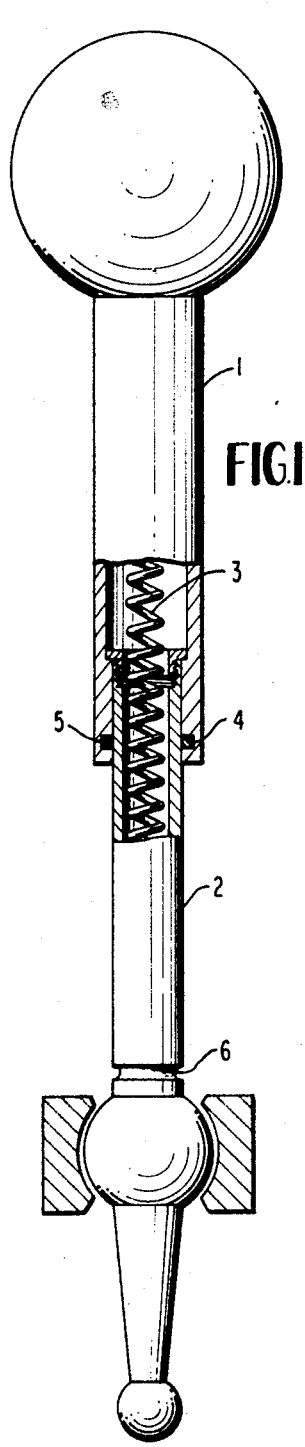
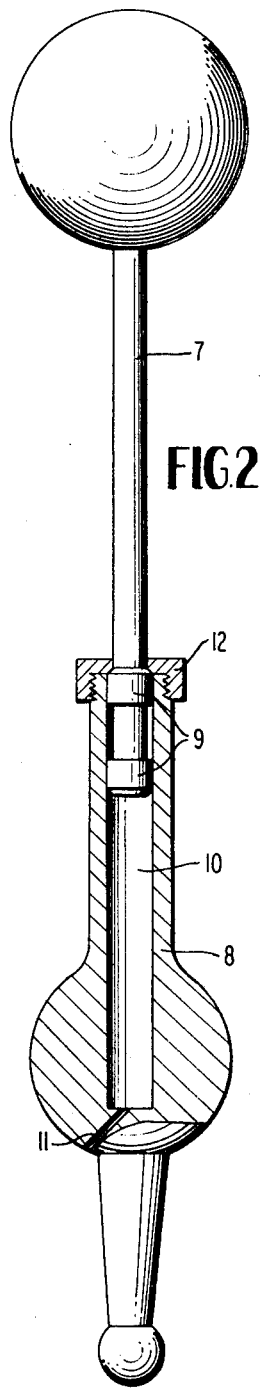
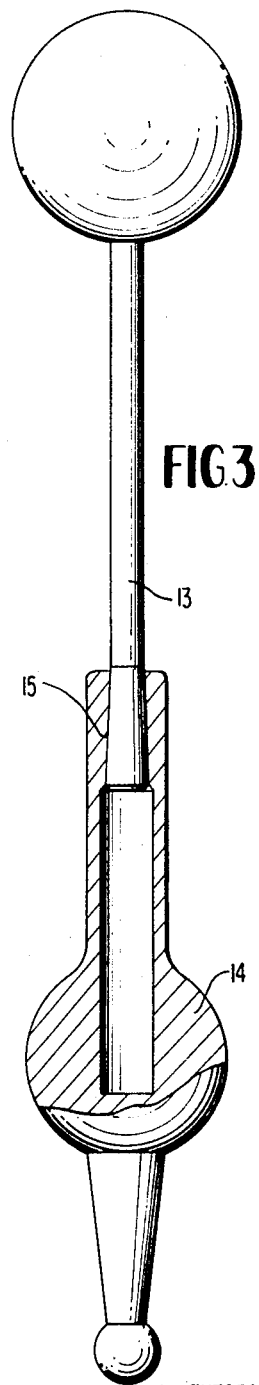
INVENTORS
RUDOLF UHLENHAUT
FRIEDRICH H. VAN WINSEN
HANS LIMMER
BY Craig, Antonelli, Stewart & Hill
ATTORNEYS

SAFETY SHIFTING LEVER FOR THE TRANSMISSION OF MOTOR VEHICLES

The present invention relates to a shifting lever for the transmission of motor vehicles which is so constructed that in case of an accident no injury danger to the vehicle passengers arises.

It is known that considerable internal injuries of the vehicle passengers can be caused in case of accidents by the customary transmission shifting levers which are non-yielding in the axial direction. Consequently, the present invention is concerned with the task to so construct a transmission shifting lever that this danger is eliminated.

As solution to the underlying problems, a safety shifting lever for the transmission of motor vehicles is therefore proposed which according to the present invention consists of parts guided telescopically one within the other which are displaceable with respect to one another under the influence of essentially axial pressure forces that are larger than the forces necessary for the shifting of the transmission. As a result thereof, the shifting lever can be collapsed in case of an impact of a vehicle passenger, for example, so far that its handle part lies below the height of the seat.

The parts of the shifting lever may thereby be displaceable preferably against a pressure spring whereby a detent mechanism is to be provided which retains the mutually displaced parts in an end position.

However, it may also be advantageous if the parts of the shifting lever are mutually displaceable by overcoming a frictional force.

At least one synthetic material bushing may be secured thereby at a part which is inserted under prestress into a bore of the counter-part. With such an arrangement a constant displacement force can be achieved over the entire possible displacement path.

However, two parts each of the shifting lever can also be retained in their starting or initial, normal position by a friction cone connection whereby a corresponding pressure force then has to be applied only for the disengagement of this connection.

Accordingly, it is an object of the present invention to provide a safety shifting lever for motor vehicle transmissions which avoids by simple means the aforementioned shortcomings and drawbacks encountered in the prior art.

Another object of the present invention resides in a safety shifting lever for the transmission of a motor vehicle which eliminates the danger of internal injuries to the vehicle passengers in case of impact against the shifting lever during an accident.

A further object of the present invention resides in a safety shifting lever for motor vehicle transmissions which is able to yield in the axial direction under the influence of forces that are larger than the forces necessary for shifting, yet is simple in construction, involves relatively few and inexpensive parts, and is easy to assemble.

These and further objects, features and advantages of the present invention will become more obvious from the following description when taken in connection with the accompanying drawing which shows, for purposes of illustration only, several embodiments in accordance with the present invention, and wherein:

FIG. 1 is a view, partially in cross section through a first embodiment of a safety shifting lever in accordance with the present invention; and FIGS. 2 and 3 are partial cross-sectional views, similar to FIG. 1, of two modified embodiments of a safety shifting lever in accordance with the present invention.

Referring now to the drawing and more particularly to FIG. 1, the shifting lever illustrated in this figure includes two telescopic parts 1 and 2 guided one within the other, whereby the part 1 can be displaced over the part 2 against the force of a coil spring 3. In order to be able to retain both parts 1 and 2 in an end position (not shown) in which the parts are collapsed as a result of part 2 sliding into part 1, in order to preclude injuries by the part 1 of the shifting lever otherwise impelled or snapping upwardly during unloading, an annular spring 5 is arranged in an annular groove 4 within the part 1 of the shifting lever which in a corresponding position of the parts 1 and 2 with respect to one another engages in an annular groove 6 within the part 2 and thus mutually locks the parts 1 and 2 in their end position.

The shifting lever illustrated in FIG. 2 includes two telescopically displaceable parts 7 and 8 whereby two synthetic material bushes 9 of any suitable material, for example, of synthetic resinous material, are secured at the part 7 which are inserted with prestress into the bore 10 of the part 8 so that during the displacement of the part 7 with respect to the part 8, an accurately definable friction force has to be overcome. A discharge bore 11 is provided at the lower end of the bore 10 which leads into the atmosphere. The lock nut 12 serves as upper abutment for the part 7.

The shifting lever illustrated in FIG. 3 finally includes two telescopically displaceable parts 13 and 14 which are retained in their position by a friction cone connection 15. The force necessary for the disengagement of the connection can thereby be influenced by changing the cone angle.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

What we claim is:

1. A safety shifting lever for the transmission of motor vehicles comprising: two lever parts axially aligned with one another along a lever axis, said lever parts being telescopically guided one within the other for mutual linear displacement along said lever axis with respect to one another, force responsive means for permitting said mutual linear displacement in response to axial pressure forces on said lever parts that are larger than the forces on said lever parts necessary for the shifting of a transmission, said force responsive means including compression spring means normally biasing said two parts into an initial position with a minimum of telescoping overlap corresponding to normal use of said shifting lever, and locking means for retaining said lever parts in an end position with the maximum telescoping overlap of said parts in direct response only to said mutual linear displacement.

2. A safety shifting lever according to claim 1, characterized in that said locking means include detent means.

3. A safety shifting lever according to claim 2, characterized in that said locking means includes a groove provided at one of the two parts and in that said detent means is a spring engageable in said a groove provided at one of the two parts.

4. A safety shifting lever according to claim 2, characterized in that said locking means includes an annular groove provided in one of said two parts and in that said detent means is an annular spring provided in the other of said two parts which engages in said annular groove. 7

5. A lever according to claim 1, wherein recess means in one of said two parts and said locking means include detent means engageable with said recess means for releasably retaining the mutually displaced parts in said end position, whereby said level parts can be readily restored to the initial position by release of the detent means from said recess means after experiencing the mutual displacement.

6. A lever according to claim 5, wherein said detent means is a spring and said recess means is a groove provided at one of the two parts.

7. A lever according to claim 1, wherein said two parts have facing hollow sections, and whereby said compression spring is arranged in said hollow sections for abutment at its ends with respective surfaces on said two parts.

8. A safety shifting lever for the transmission of motor vehicles comprising two parts telescopically guided one within the other which are mutually displaceable under the influence of axial pressure forces that are larger than the forces necessary for the shifting of the transmission, said parts being mutually displaceable by overcoming a frictional force, and wherein at least one synthetic bush means is provided at one part which is inserted under prestress in a bore of the other part.

9. A safety shifting lever according to claim 8, characterized in that two bushes are provided at said one part.

10. A safety shifting lever for the transmission of motor vehicles comprising two parts telescopically guided one within the other which are mutually displaceable under the influence of axial pressure forces that are larger than the forces necessary for the shifting of the transmission, and wherein the two parts are retained in the initial position thereof by a friction cone connecting means.

11. A safety shifting lever for the transmission of motor vehicles comprising: two lever parts axially aligned with one another along a lever axis, said lever parts being telescopically guided one within the other for mutual linear displacement along said lever axis with respect to one another, and force responsive means for permitting said mutual linear displacement in response to axial pressure forces on said lever parts that are larger than the forces on said lever parts necessary for the shifting of a transmission, said force responsive means including compression spring means normally biasing said two parts into an initial position with a mini-mum of telescoping overlap corresponding to normal use of said shifting lever, wherein detent means are provided for releasably retaining the mutually displaced parts in an end position with the maximum telescoping overlap of said parts, whereby said lever parts can be readily restored to the initial position by release of the detent means after experiencing the mutual displacement, and wherein said detent means includes an annular spring provided in one of said two parts which engages in an annular groove provided in the other part.

12. A safety shifting lever for the transmission of a motor vehicle comprising: two lever parts axially aligned with one another along a lever axis, said lever parts being telescopically guided one within the other for mutual linear displacement along said lever axis with respect to one another, and force responsive means for permitting said linear displacement in response to axial pressure forces on said lever parts that are larger than the forces on said lever parts necessary for the shifting of the transmission, said force responsive means including interengageable annular shaped frictional surfaces provided on each of said two parts, wherein said fric-tional surfaces are of a conical configuration.

13. A lever accordng to claim 12, wherein said frictional surfaces are aligned with respect to said two parts such that the two parts may be reconnected in their initial position by mutual axial displacement of said lever parts in a direction opposite to the direction corresponding to excess pressure forces on said shifting lever.

* * * * *